(12) United States Patent
    Ochi (10) Patent No.: US 9,047,454 B2
(45) Date of Patent: Jun. 2, 2015

(54) AUTHENTICATION DEVICE AND AUTHENTICATION SYSTEM (75) Inventor: Yasushi Ochi, Kaizuka (JP)

(73) Assignee: BLD Oriental Co., Ltd. (JP)

( * ) Notice: Subject to any disclaimer, the term of this patent is extended or adjusted under 35 U.S.C. 154(b) by 12 days.

(21) Appl. No.: 13/806,216

(22) PCT Filed: Jul. 4, 2011

(86) PCT No.: PCT/JP2011/003808
    § 371 (c)(1),
    (2), (4) Date: Dec. 21, 2012

(87) PCT Pub. No.: WO2012/011229
    PCT Pub. Date: Jan. 26, 2012

(65) Prior Publication Data
    US 2013/0117833 A1    May 9, 2013

(30) Foreign Application Priority Data
    Jul. 19, 2010  (JP) .................................. 2010-162370

(51) Int. Cl.
    G06F 21/32      (2013.01)
    G06F 21/83      (2013.01)
    H04L 29/06      (2006.01)
    G07C 9/00       (2006.01)

(52) U.S. Cl.
    CPC ............... *G06F 21/32* (2013.01); *G06F 21/83* (2013.01); *H04L 63/0861* (2013.01); *G07C 9/00071* (2013.01); *G06F 2221/2117* (2013.01)

(58) Field of Classification Search
    None
    See application file for complete search history.

(56) References Cited

U.S. PATENT DOCUMENTS

| 2004/0111273 A1* | 6/2004 | Sakagami et al. ............. 704/277 |
| 2008/0034411 A1* | 2/2008 | Aoyama ........................... 726/5 |
| 2009/0328205 A1* | 12/2009 | Ims et al. ....................... 726/22 |

FOREIGN PATENT DOCUMENTS

| JP | 1162345 A    | 3/1999  |
| JP | 2001249941 A | 9/2001  |
| JP | 2002140559 A | 5/2002  |
| JP | 2004302645 A | 10/2004 |
| JP | 2010140499 A | 6/2010  |

OTHER PUBLICATIONS

International Search Report; Application No. PCT/JP2011/003808; Sep. 6, 2011; Japanese Patent Office.

* cited by examiner

*Primary Examiner* — Jung Kim
*Assistant Examiner* — Tri Tran
(74) *Attorney, Agent, or Firm* — Stevens & Showalter LLP (57) ABSTRACT A biological information authentication device is provided with a biological information memory means, a user group information confirmation means, a biological information registering means and an authentication unit. The user group information is the information representing a trust relationship among a plurality of users; the biological information memory unit associates each biological information extracted from a plurality of users with the user group information and stores them. The user group information confirmation unit receives a determination as to whether or not a trust relationship exists among a plurality of users from whom the biological information is extracted and confirms the relationship between users. The biological information registering unit matches the user group information and stores each biological information extracted from each user in association with the biological information memory means.

8 Claims, 7 Drawing Sheets

FIG. 7

AUTHENTICATION DEVICE AND AUTHENTICATION SYSTEM

TECHNICAL FIELD

This Invention relates to an authentication device and an authentication system. It is the biological authentication device and biological authentication system which is most suitable for the safe transaction or protection of information in the particularly specific group.

BACKGROUND ART

Currently, in place of the ID cards, an authentication technology is developed by using various biological information such as dactylogram, voice prints, iris, and face. It is used widely currently because it is difficult to make spoofing such as theft of the ID cards. Furthermore, the authentication technology using the biological information can be applied to various field.

For example, the configuration that applied a biological authentication technology to a biological information authentication device is disclosed in the following patent documents.

Furthermore, for example the conventional authentication technology using the biological information is applicable to authentication technology for portal site. Here, the portal site is a huge Web site becoming the entrance of the Internet. With a core of a search engine and links page, the function, such as communications service like news or the stock prices, the Web mail service available from browser, electronic bulletin board, and chat; that is function required on the Internet for users is contributed free of charge. And by attracting more customers this is a site with an income by advertisement or electronic commerce intermediary service. By applying the authentication technology to the portal site, the portal site capable of using by only an authorized user can be configured.

SUMMARY OF THE INVENTION

Problem Invention is to Solve

In general, there are often flooding the false information and overflowing the annoying information for users because the service available in the portal site such as the bulletin board is used by anonymity. In order to solve this problem, Configuration that the anonymity of the user is removed, that users are selected, and that user's information is opened each other in the portal site, is considered.

However, if all the privates information of the user is opened each other, it will be expected that the number of users using the portal site decreases. Furthermore, if selecting the users includes secrecy, the openness in the portal site becomes meaningless.

For example, a method to secure the openness in the portal site by the invitation (method to show portal site by inviting a user hoping for a utilization in newly the portal site) is known.

The invitation-related method often invites an anonymous user and invites a user feigning a false name and other information as a new user. Therefore, it becomes impossible to secure openness in the portal site.

This Invention brought about by above background, the object of the invention is to provide authentication technology to provide the safe service to secure openness in the member service, in particular member service such as the portal site.

Means for Resolving the Problem

This invention to achieve the problem is a biological information authentication device for authenticating a user by using a biological information extracted from the user. And, biological information authentication device of this Invention includes a biological information memory unit, a user group information confirmation unit, a biological information registering unit, and authentication unit. The user group information is information showing a trust relationship between plurality of users. The biological information memory unit stores an each biological information extracted from a plurality of user and associated to the user group information. The user group information confirmation unit receives determination on whether the trust relationship exists between the plurality of users that their biological information is extracted, and it confirms the relationship between the users. And, a biological information registering unit adjusts the user group information and stores the each biological information extracted from each user associated to the biological information memory unit, if the relationship between each user is confirmed by the user group verification unit. Furthermore, an authentication unit authenticates the users registered by the biological information registering unit.

By above configuration, each biological information extracted from a plurality of user is memorized, in association with the user group information which is information showing the trust relationship between plurality of users. Furthermore, the biological information registering unit adjusts the user group information and stores the each biological information extracted from each user associated to the biological information memory unit. Therefore, the authentication device for accepting only the user where trust relationship is established can be configured because the users matching the user group are accepted by authentication unit among users matching in the biological information stored by the biological information memory unit.

In accordance with an aspect of the present invention, biological information search unit searches the biological information matching in the biological information of a plurality of user targeted for authentication from biological information stored by the biological information memory unit. And, it is desirable to employ the configuration that authentication unit authenticates a plurality of user if the biological information retrieved by the biological information search unit matches with the biological information of the user targeted for authentication and the user group information of the plurality of user matches, By above configuration, the network that only the user where trust relationship is established is accepted can be configured because only the user where biological information matches and the users where the user group information that trust relationship is established matches among users retrieved by the biological information search unit can be authenticated.

In accordance with an aspect of the present invention, it is preferable that the user group information confirmation unit furthermore comprises a unit for receiving the determination of an administrator which authenticate and for extracting the biological information of the administrator. It can secure credibility of the trust relationship by determining the trust relationship between users by an administrator.

If the biological information can identify an individual and can extract from a person (identification information), the aspect does not matter. It is desirable that the biological information is in combinations of one or more information selected from among face information, fingerprint information, hand geometry information, retina information, iris information, blood vessel information, voice information, and ear recognition information When biological information is face information, the following configuration can be employed. That is, the biological information memory unit associates a user name information from the user's biological information, with said biological information, and memorizes. And, the biological information search unit, searches the name information associated with the biological information, and a voice may be uttered based on the name information, with the state displaying a face corresponding to the biological information retrieved by the biological information search unit.

In accordance with an aspect of the present invention, the biological information memory unit may memorize the biological information extracted from said user as distinguishing a user in the main user and auxiliary user, and the user group information confirmation unit may receive the determination on whether there is a trust relationship between at least one of the main user and at least one of the auxiliary user. By above configuration, the biological information memory unit may store memory in the form of a guardian as main user and child as auxiliary user, authentication device for authenticating in the case the relationship (trust relationship) of guardian and the child is confirmed may be configured.

This invention to achieve the problem may be a biological information authentication system for authenticating a user by using a biological information extracted from the user. And, the biological information authentication system of this Invention includes a plurality of biological information authentication device described above and the server which is coupleable via a network. And, each biological information authentication device transmits a biological information stored by the biological information memory unit against the server, and the server transmits each received biological information against the biological information memory unit provided in the plurality of biological information authentication device.

In the above configuration, the biological information authentication device is employed. Therefore, authentication system for authenticating only the user where trust relationship is established can be configured because the users where user group matches are accepted by authentication unit among users matching in biological information stored by biological information unit. The biological information authentication device of this Invention or the biological information authentication system of this Invention are preferably available.

Effects of the Invention

In a biological information authentication device and biological information authentication system of this invention, a biological information extracted from users associated to a user group information for showing a trust relationship between users is memorized. Furthermore, with adjusting the user group information, a biological information registering unit memorizes the each biological information extracted from each user by associating to the biological information memory unit. Therefore, Authentication device and authentication system for authenticating only the users having a trust relationship can be configured because the users where user group matches are accepted by authentication unit, among users matching in the biological information stored in the biological information memory unit.

DESCRIPTION OF THE PREFERRED EMBODIMENT (Detailed Description of the Preferred Embodiment 1)
<Biological Information Authentication Device>

Figure 1:
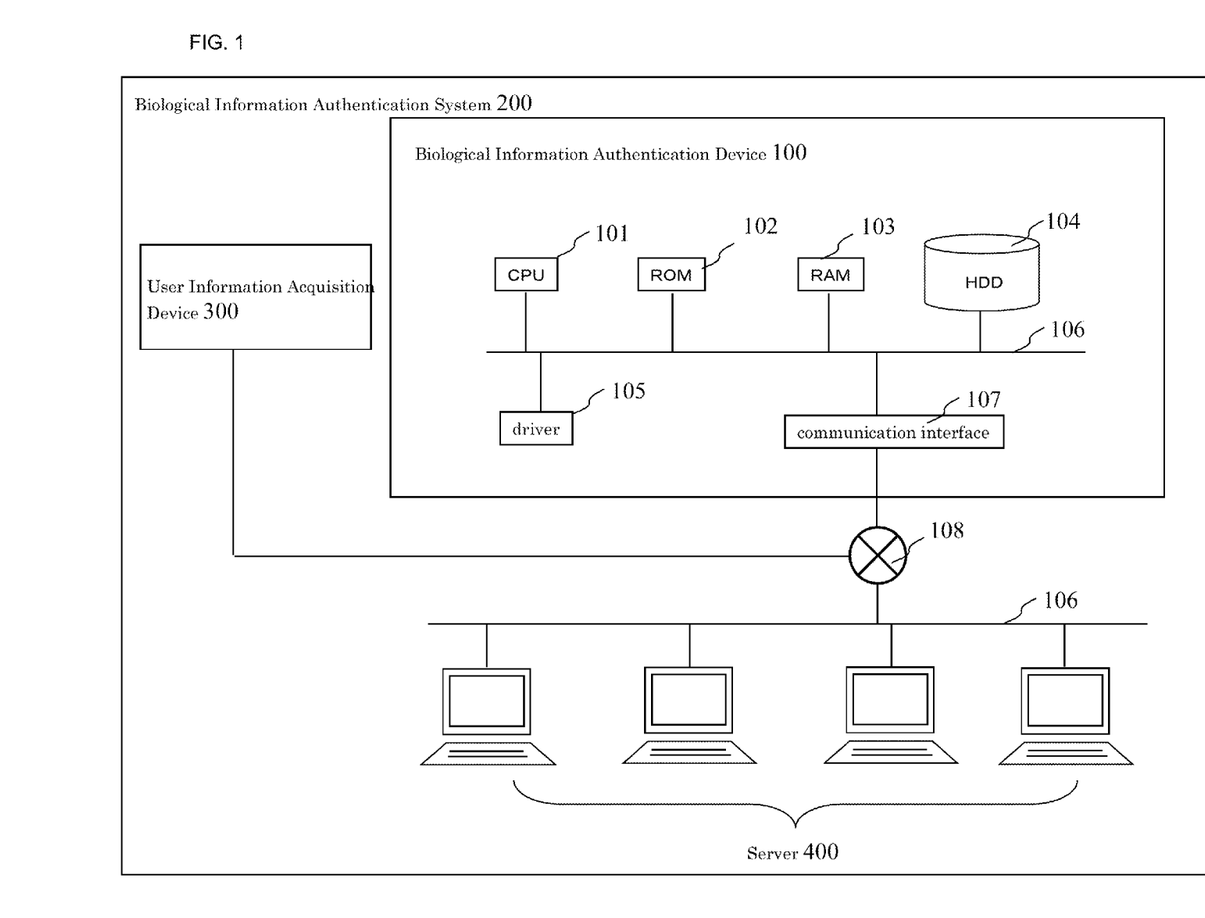
FIG. 1 is a block diagram illustrating the control system hardware configuration of a user authentication system in accordance with an embodiment of the present invention.

Using FIG. 1, control drive hardware configuration of the biological information authentication device 100 (hereinafter referred to as authentication device) and biological information authentication system 200 (the system connecting authentication device 100 and user information acquisition device 300 via a network) is explained. FIG. 1 is an outline configuration of the control drive hardware regarding the biological information authentication device 100 configuring the biological information authentication system 200 and also it is an outline configuration of the user information acquisition device 300 and server 400. However, the details of the all parts which do not directly-relate to the present invention will be omitted.

CPU (Central Processing Unit) 101, ROM (Read Only Memory) 102, RAM (Random Access Memory) 103, HDD (Hard Disk Drive) 104, the driver 105 which corresponds to each drive part, and communication interface 107 are connected to the control circuit of the authentication device 100 by internal bus 106. For example, by using a RAM 103 as working area, and executing a program stored by ROM 102 and HDD 104, and communicating the data and indication from Driver 105 and a operating part based on the execution effect, CPU 101 controls the actions such as each drive shown in the above view. The server 400 is accessible to a network 108 via a communication interface 107, And the CPU of the server 400 delivers data to a biological information authentication device 100 and a user information acquisition device 300 connected to the network 108, via the communication interface 107.

Furthermore, CPU, ROM, RAM, an HDD, the driver corresponding to each drive, and communication interface are included to the server 110 as is the case with biological information authentication device 100, however these are not shown in the figure. And, each means (shown in FIGS. 2 and 7, FIG. 8) to be described below are implemented by executing a program by CPU. The Server 400 is accessible to network 108 via a communication interface. And the CPU of the server 400 delivers data to a biological information authentication device 100 and a user information acquisition device 300 connected to the network 108, via the communication interface.

Furthermore, CPU, ROM, RAM, an HDD, the driver corresponding to each drive, and communication interface are included to the server 110 as is the case with biological information authentication device 100, however these are not shown in the figure. Each means (unit) are implemented by executing a program by CPU. Because this Invention performs user identification by using a face recognition system (An application for computers to discern a human face from digital image automatically. The system for discerning by pulling out the part thought to be the human face in a photographed image and then by comparing to the face image database.), the equipment capable of the facial recognition is provided to the biological information authentication device 100 and user information acquisition device 300. For example, the camera capable of photographing the user's face image, application program for recognizing a face portion from the face image, and also by registering the name of the user in recognizing users, a speaker capable of sending the voice including a registered name to a user are provided.

<User Group Authentication Handling 1 New Registration>

Figure 2:
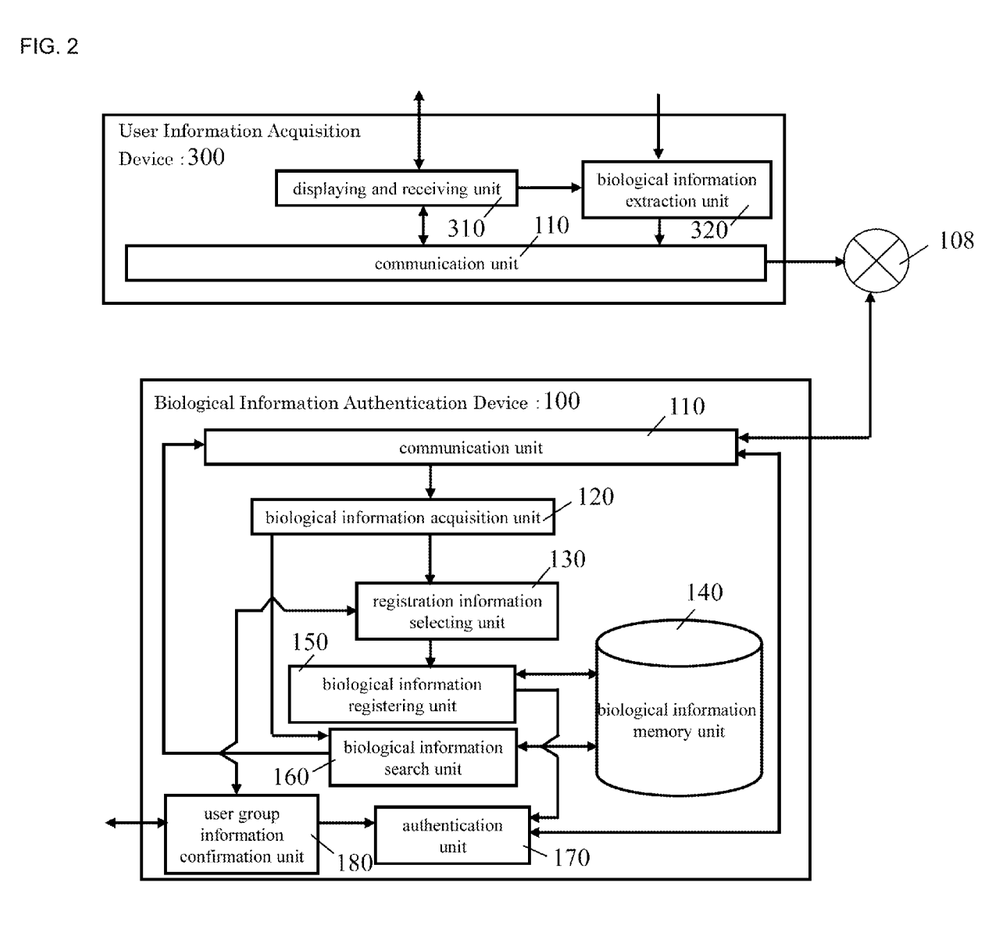
FIG. 2 is a functional block diagram of biological information authentication device in accordance with an embodiment of the present invention.
Figure 3:
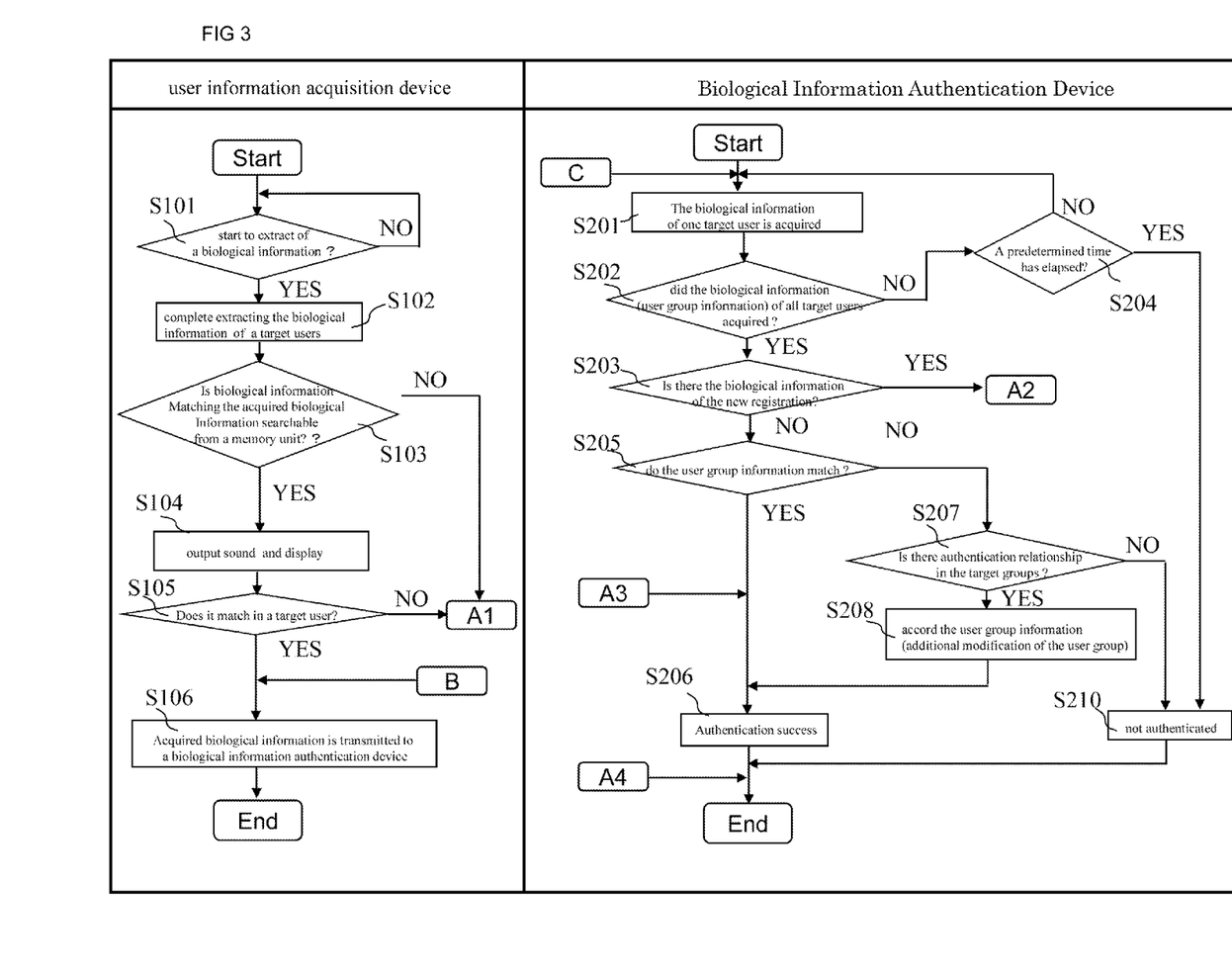
FIG. 3 is a flowchart of the user group authentication handling of this Invention.
Figure 4:
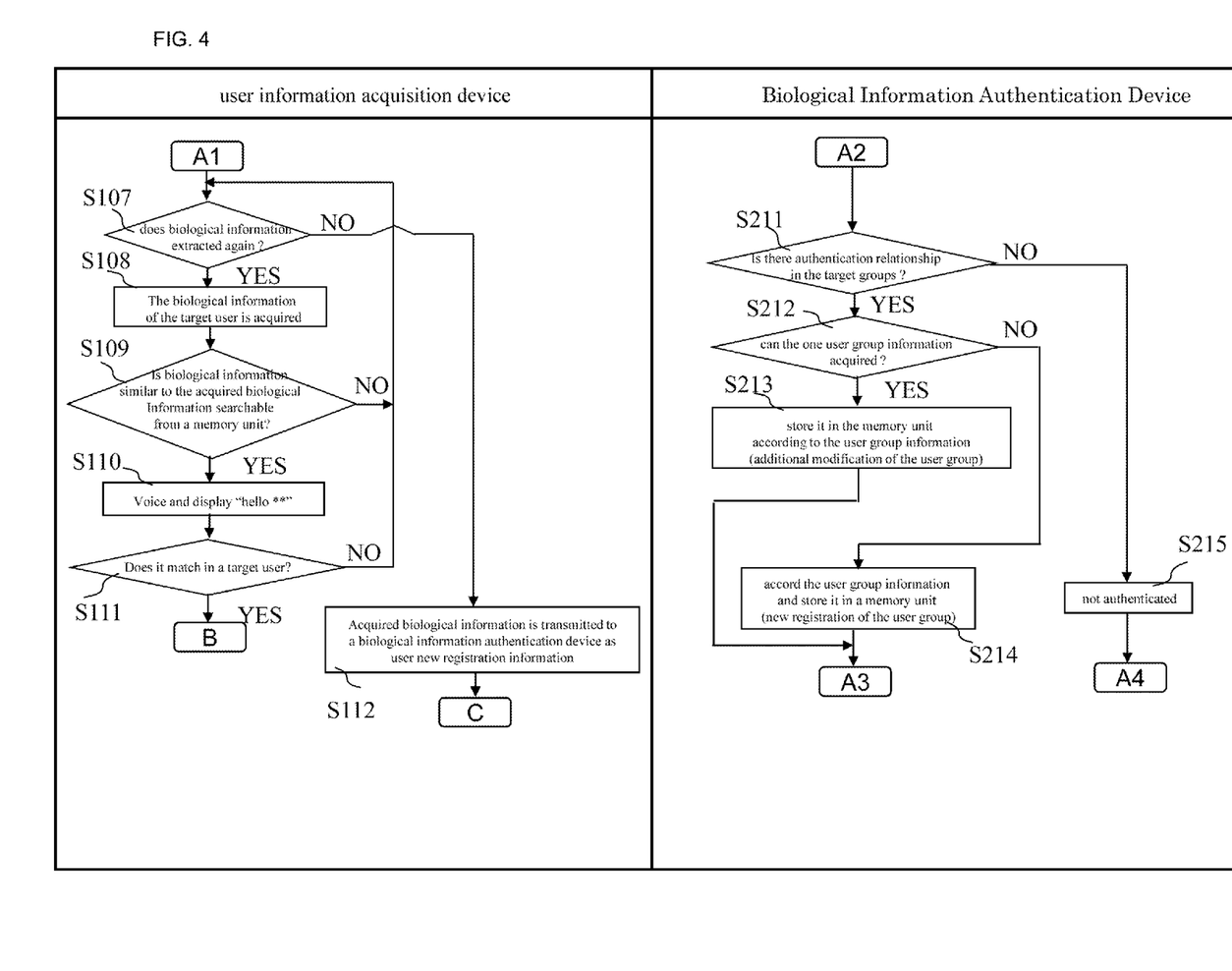
FIG. 4 is a flowchart of the user group authentication handling of this Invention.

Next, user group authentication handling in authentication device 100 of this Invention is explained with reference to the drawings. FIG. 2 is a functional block diagram of the biological information authentication device, and FIG. 3 and FIG. 4 are a flowchart of the user group authentication handling of this Invention. The "S" putting on before the numbers of the flowchart, means a step.

In accordance with the present invention, a plurality of user is authenticated as user group (as will be described below). Therefore, each user shall be discerned by affixing alphabet behind a user name. In the following description, each user is selected as user A, user B. Furthermore, in the present embodiment, among selected users, one is child and the other is guardian.

The configuration to recognize a face information (meaning the digital information recognized as user's face, the same shall apply hereinafter) as biological information is explained as follows. Furthermore, about user information acquisition device 300 for acquiring the face information of each user, two user information acquisition devices 300 for acquiring the face information corresponding to user A user B (meaning the users corresponding to the relationship such as a parent and the child) may be provided. Alternatively, face information of user A and user B may be acquired with one user information acquisition device 300. With one user information acquisition device 300, face information of user A and user B may be acquired at the same time.

At first, we explain the cases where the face information of user A and user B has not been registered with authentication device 100 and server 400 (the configuration of the server is described below) (hereinafter called a new user group entry). Further as follows, only a user A is explained as an example, but, face information of user B is acquired in addition to user A. Three or more human face information of users may be acquired. According to the present invention, user group is authenticated where there are relationship (called an authentication relationship or trust relationship, to be described) between the users in the group. To make the relationship clear, in the following, above authentication device 100 is also referred to as a biological information authentication device 100.

User information acquisition device 300 starts extract of the face information of user A and completes extracting face information of user A (FIG. 3: START→S101→S102). For example, the starting switch for starting extract handling of the face information is comprised to the user information acquisition device 300, and by pushing down the starting switch by user A, extract handling of the face information may be started The switch can employ a touch panel displayed on a screen of the user information acquisition device 300. The mechanism (for example, touch panel) for notifying the decision of users such as the extract start of the face information to the user information acquisition device 300 is referred to as a displaying and receiving means 310. That is, when the user A pushes down the starting switch, displaying and receiving means 310 accepts information of the starting of the acquisition of the face information, and gives the biological information extraction means 320 notice of information extracting face information of user A. In response to this, the biological information extraction means 320 starts to extract the face information of user A. For example, biological information extraction means 320 extracts the digital information of the point where the face of user A is recognizable with the camera capable of photographing the user's face image.

As described above, when the biological information extraction means 320 extracts the face information of user A, it is determined whether concordance face information or similar to the extracted face information exists (FIG. 3: S103). User information acquisition device 300 may determine this, and the biological information authentication device 100 may make decision by transmitting the face information to the biological information authentication device 100. In the following we explain the case the biological information authentication device 100 makes decision. In the case the user information acquisition device 300 makes decision, after-mentioned biological information search means 160 and biological information memory unit 140 are provided in the user information acquisition device 300.

In the case the biological information authentication device 100 makes decision, It corresponds in the face information which biological information extraction means 320 extracted or refers information doing similar face retrieval of information to said face information. The orders of retrieval of face information with concordant or similar to extracted face information are affixed to the face information by above biological information extraction unit 320, And, the biological information extraction unit 320 transmits the face information to the biological information authentication device 100 via communication unit 110. Biological information acquisition unit 120 in the biological information authentication device 100 acquires the transmitted face information. When biological information acquisition unit 120 confirms the orders of the retrieval affixed to face information, notifies the orders to retrieve the face information to the biological information search unit 160. In response to this, the biological information search unit 160 acquires face information (hereinafter called retrieval face information) with concordant or similar to extracted face information (hereinafter called targeted face information) by reference to the biological information memory unit 140 provided to the biological information authentication device 100. For example, from the biological information memory unit 140, the biological information search means 160 may retrieve the face information corresponding in the face information acquired based on the image data having the multiple sites capable of the identification of the face and based on the data of the human face characteristic portion. At this time, biological information search unit 160 acquires name information (is described below) associated with the retrieval face information, together with retrieval face information. And, the biological information search unit 160 transmits acquired the retrieval face information to the user information acquisition device 300 via communication unit 110. At this time, when the retrieval face information cannot be acquired, biological information search unit 160 transmits that information.

When the retrieval face information is transmitted to user information acquisition device 300, the displaying and receiving unit 310 accepts this, and displays the retrieval face information to a display screen. At this time, the displaying and receiving unit 310 may output sound including the name information associated with the retrieval face information from the predetermined speaker (FIG. 3: S104).

In the case of the new user group registration, the retrieval face information in agreement with the face information of user A does not exist. In this case, the information there is no retrieval face information is displayed to the displaying and receiving unit 310. Alternatively, if the retrieval face information similar with the face information of user A exists. The speaker provided to the user information acquisition device 300 outputs the sound including the registered user's name (user associated with in face information similar to user A). Of course, the name included in the sound outputted from the speaker does not correspond with the name of user A which is a target user because, like an above discussion, user A is absence of registration. In the case of the new registration, retrieval of face information corresponding in the acquired face information doesn't, have to be performed, by providing new user group registration switch to the user information acquisition device 300 separately. The switch can employ a touch panel displayed on a screen of the displaying and receiving unit 310.

As described above, if face information of user A cannot retrieve concordant face information from the biological information memory unit 140, user A determines whether having the intention to extract the face information of user A again by the biological information extraction means 320, and above displaying and receiving means 310 acquires the determination outcome of user A (FIG. 3: S103NO→A1). For example, if user A wants to extract face information again, the displaying and receiving means 310 accepts the determination, by pushing down the starting switch provided to the displaying and receiving unit 310 of the user information acquisition device 300. In response to this, displaying and receiving means 310 acquire the information as to whether or not to perform re-extract of the face information. If it is extracted again, the displaying and receiving means 310 notifies order to extract the face information of user A again to the biological information extraction unit 320. And, just like above handling, the face information with concordant or similar to extracted face information is retrieved (FIG. 4: A1→S107YES→S108→S109→S110→S111).

On the other hand, when the user A notifies the information that he or she does not hope for re-extract of the face information to the displaying and receiving unit 310, the displaying and receiving unit 310 affixes (the flag is enough) new registration information to the acquired information of the user A (target user) and, notifies orders to transmit it to the biological information authentication device 100 to the communication unit 110 in the user information acquisition device 300. In response to this, communications unit 110 transmits the targeted face information to the biological information authentication device 100 (FIG. 4: S107NO→S112). Alternatively, the information most recently transmitted targeted face information becomes the user new registration information may be transmitted to the biological information authentication device 100. The above-mentioned step is executed to not only user A but also user B. Therefore, the user information acquisition device 300 transmits the face information of user B to the biological information authentication device 100 as well as that of user A.

As described above, when the face information as the new registration information is transmitted to the biological information authentication device 100, in response to this, the biological information acquisition unit 120 provided to the biological information authentication device 100 acquires the face information (targeted face information) of user A which is a target user (FIG. 3: B→S106, FIG. 3: C→S201). Biological information acquisition unit 120 continues taking step until the targeted face information of all target users is acquired (FIG. 3: S202YES). If the targeted face information of the next target user cannot be acquired, after a lapse of proper time from acquiring the targeted face information of one target user, the biological information acquisition unit 120 terminates handling without authenticating the target user (FIG. 3: S202NO→S204YES→S210→END).

And, the biological information acquisition unit 120 determines whether acquired targeted face information is new registration information. That is, information (e.g., a flag) of new registration information affixed to acquired targeted face information is confirmed, and whether acquired targeted face information is new registration information is determined (FIG. 3: S202NO→S203).

In the case of a new group registry (FIG. 3: S203YES→A2), the biological information acquisition unit 120 gives the registration information selecting unit 130 the notice of the information there exist new registration. In response to this, registration information selecting unit 130 inquires the user group information confirmation unit 180 whether there is authentication relationship to plurality of target users each other (user A and user B in the above example). And, if there is authentication relationship in the target groups each other, the information there exist the authentication relationship is notified to the user group information confirmation unit 180 (FIG. 4: A2→S211). Here, authentication relationship is a trust relationship of the target users, and is the trust relationship (corresponding to the relationship such as the friend relationship, parent and child, brothers, and the relative) capable of being authenticated by a system (the private site that authenticates, for example, only a plurality of trusted user) using the authentication device 100 of this invention. For example, if the user information acquisition device 300 and the biological information authentication device 100 are installed in a playground equipment facility comprising plurality of amusement apparatus, the authentication relationship will show at least one people is a child (mean users to play with in a playground equipment of the playground equipment facility), and the other will show relationship called the guardian who can pay the moneys such as fee.

For example, if the user A and user B are parent and child, the authentication relationship is established. In this case, administrators (the person having a determination authority whether it may be authenticated or not by a system using the authentication device 100 of this invention) may determine whether the authentication relationship really exists or confirms. When the authentication relationship is confirmed, the information there exist the authentication relationship is notified to the user group information confirmation unit 180. A user group information confirmation unit 180 gives the registration information selecting unit 130, notice of the information there exist authentication relationship in target users each other.

In the present embodiment, because any users are a new user group registration, the user group information (the identification number that target users have commonly, and showing the information that authentication relationship exists in the target users) does not exist. In this case, the registration information selecting unit 130 gives notice of the orders to accord the user group information of user A and user B and to store the both users by a biological information memory unit 140, against the biological information registering unit 150. In response to this, the biological information registering unit 150 matches the user group information of user A and user B and the biological information memory unit 140 stores both users (the identification information of the face information of both users is enough), so authentication succeeds (FIG. 4: S212NO→S214→A3→S206→END). On this occasion, biological information memory unit 140 stores the information such as both user's name (user name) and gender, together. At this time, the displaying and receiving means 310 of the user information acquisition device 300 gives off the sound of registered user name.

Figure 5:
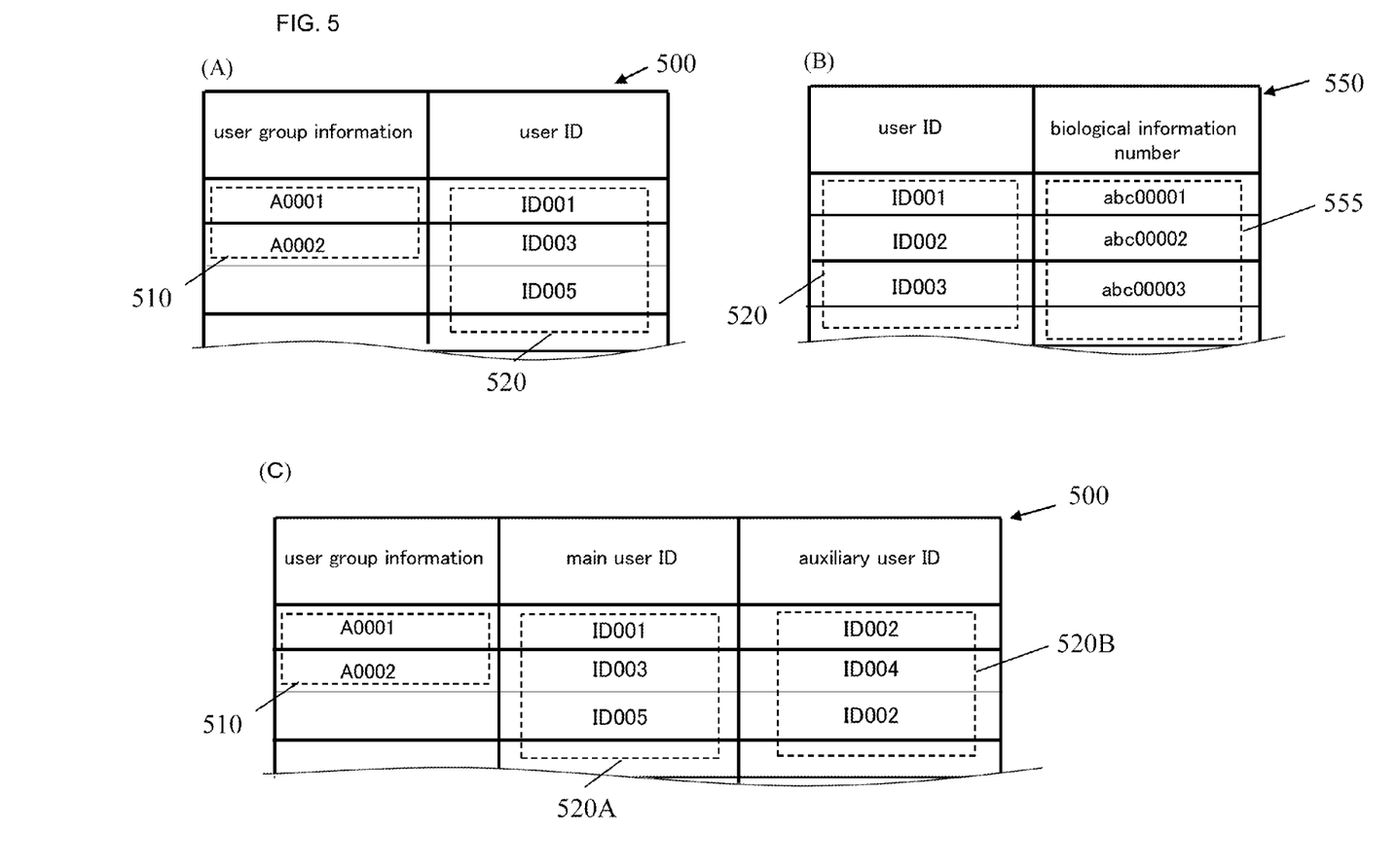
FIG. 5 is a block diagram of table stored by the biological information memory unit in accordance with the embodiment of this Invention.

For example, the biological information registering unit 150 store the face information set user group information to the data table 500 (cf. FIG. 5 (A)) of biological information memory unit 140. User ID 520 which is the identification number of each user to be described below and the user group information number 510 are associated with and stored in the data table 500. The biological information memory unit 500 stores the face information data corresponding to the face information identification number. In the present embodiment, as shown in FIG. 5 (B), the user ID 520 and the biological information number 555 that is a face information data are stored associated with each other. In the present embodiment, we explained to case each user is the new registration. When at least one of user is an existing registration, it is explained in the following detailed description of the preferred embodiment 2.

The users where trust relationship is established may be expressly distinguished in the main user and an auxiliary user. For example, against the guardian capable of payment of the money as the main user (user A) and a child as auxiliary user (user B), the user group authentication may be performed. In the following, we explain only differences against above detailed description of the preferred embodiment.

As shown in FIG. 5 (C), about the user ID stored to the biological information memory unit 140, it is stored distinguished expressly from main user ID 520A and auxiliary user ID 520B. And, among the users where user group information accords by authenticating one user from main user and authenticating one user from auxiliary user, it is authenticated as user group. Furthermore, the administrator determines or confirms, whether authentication relationship exists between main user (guardian) and the auxiliary user (child), and when the authentication relationship is confirmed, the information there exist the authentication relationship is notified to the user group information confirmation unit 180. And, the user group information confirmation unit 180 gives notice of the information there exist authentication relationship to target users, against the registration information selecting unit 130.

Figure 6:
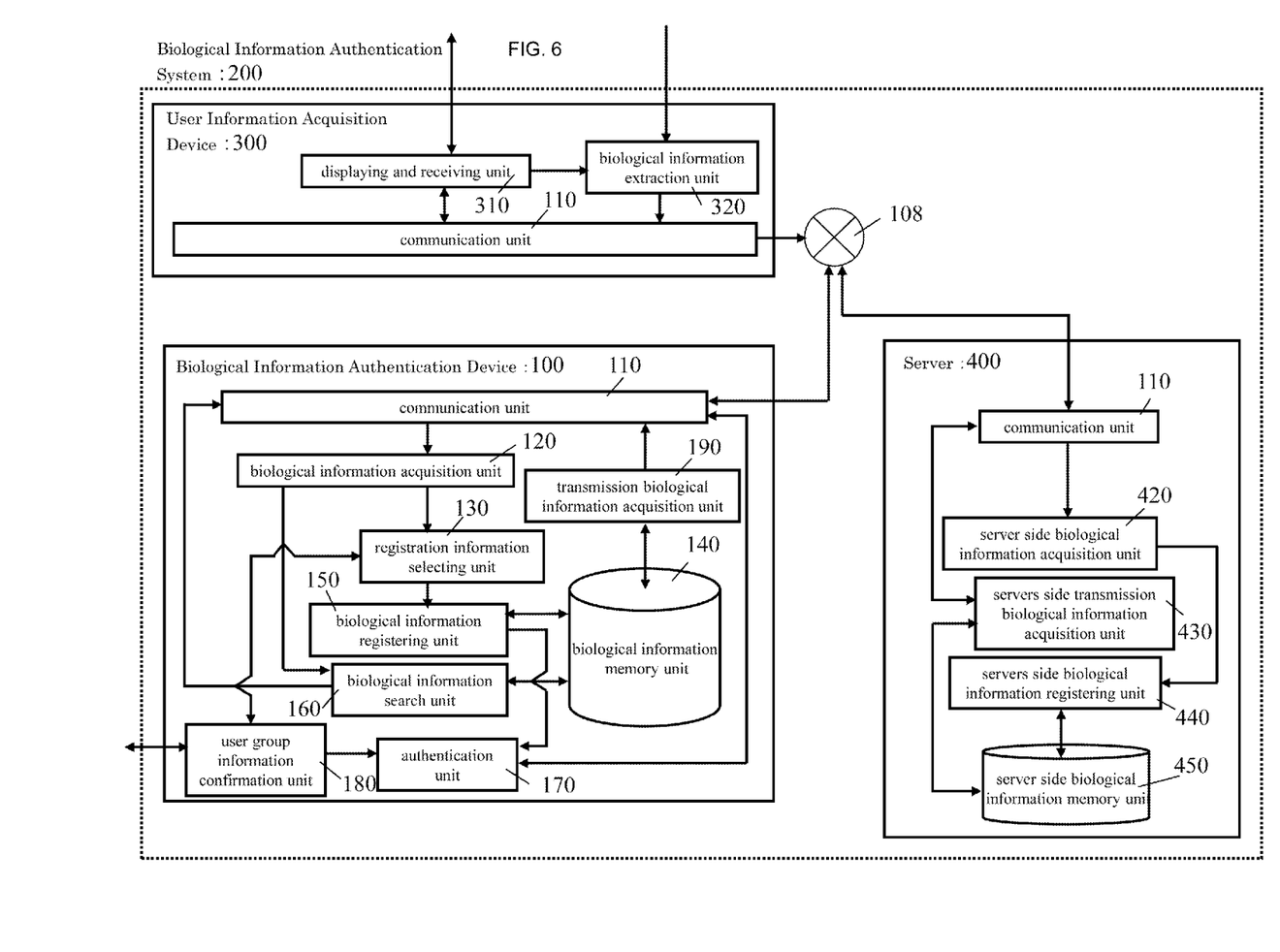
FIG. 6 is a functional block diagram of biological information authentication system in accordance with an embodiment of the present invention.
Figure 7:
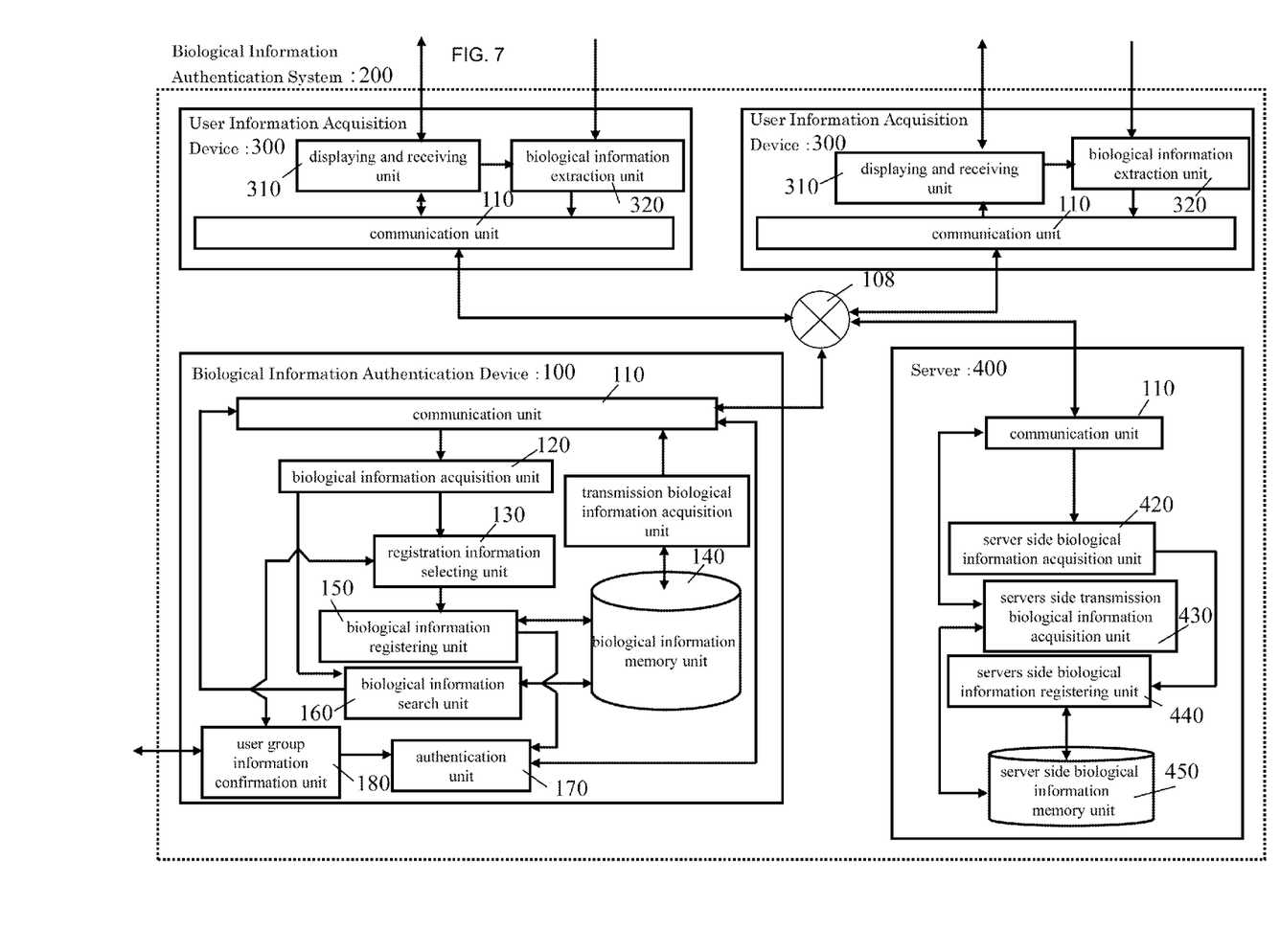
FIG. 7 is a functional block diagram of biological information authentication system in accordance with an embodiment of the present invention.

As shown in FIG. 6, FIG. 7, by providing the plurality of the biological information authentication device 100 of the present example, and by providing the biological information memory unit 140 in each biological information authentication device 100 and server, user group authentication system may be configured. That is, the server includes a server side biological information memory unit 450, after every predetermined period, the face information of a target user stored to the biological information memory unit 140 of the biological information authentication device 100 side is transmitted to the biological information memory unit 140 of the server side. For example, after predetermined time, a transmission biological information acquisition unit 120 of above authentication device 100, transmits the face information which should transmit against a server via communication unit 110 with reference to the biological information memory unit 140 of authentication device 100 side. Transmission biological information acquisition unit 120 may transmit only renewal information to a server A server side biological information memory unit 450, is provided with a server side biological information acquisition unit 420 for receiving the face information via communication unit 110, and with a server side biological information registering unit 440 for storing received biological information in the server side biological information memory unit 450. And, after every predetermined period, the server side transmission biological information acquisition unit 420 transmits the face information stored in the server side biological information memory unit 450 to the biological information memory unit 140 of each biological information authentication device 100. The biological information authentication device 100 for transmitting the face information stored in the server side biological information memory unit 450 may be specified beforehand. For example, the address information of the facility installed with the biological information authentication device 100 is memorized beforehand, and the face information may be transmitted so that the same information is memorized to biological information authentication device 100 in a facility installed in the adjacency area (it can be defined with address unit such as every city or every prefecture) of each address.

Detailed Description of the Preferred Embodiment 2

<User Identification Handling 2, in the Case of a Registered>

Then, the case at least one user have been already registered is explained, among plurality of users. As follows, as an example, only user C is explained, but, besides user C, face information of user D is similarly acquired. Face information of three or more users may be acquired. In the following we explain user C as an existing registered user and explain user D as new registration user having authentication relationship against user C. As for the handling except the case at least one user have been already registered, among plurality of users, drawing and illustration is omitted because it is same to the detailed description of the preferred embodiment 1.

At first, user information acquisition device 300 starts extract of the face information of user C and retrieves face information of user C (FIG. 3: START→S101YES→S102). And, user information acquisition device 300 acquires the face information according in acquired face information from the biological information memory unit 140. And, the speaker provided to the displaying and receiving means 310 of the user information acquisition device 300 gives off the sound of the user name stored with the retrieved face information (FIG. 3: S103YES→S104). For example, the sound of "Welcome! C" may come from the speaker. When user C which is a target user is confirmed by the retrieved face information and the sound from the speaker, the retrieved face information (retrieval face information) is transmitted to the biological information authentication device 100 (FIG. 3: S105YES→S106). The face information identification number for identifying the retrieval face information may be transmitted in place of the retrieval face information.

Like acquisition of the face information of user C, the face information of user D is acquired by the user information acquisition device 300 (FIG. 3: START→S101YES→S102). Face information according face information of acquired user D cannot be retrieved because user D is a new registration user (FIG. 3: S103NO→A1). Therefore, as described below, face information of user D is stored as a new registration information. That is, when the user D notifies the information that he or she does not hope for re-extract of the face information to the displaying and receiving unit 310, The displaying and receiving unit 310 affixes (the flag is enough) the new user registration information to the acquired information of the user D (target user), and transmits to biological information authentication device 100 via communication unit 110 (FIG. 4: A1→S107NO→S112→C).

When all the face information (targeted face information) of the target user is transmitted to biological information authentication device 100, the biological information acquisition unit 120 of the biological information authentication device 100 determines whether the face information about the user of the new registration is included (FIG. 3: C→S201→S202YES→S203). That is, the biological information acquisition unit 120 (or a memory) maintains all the face information of the user group and, among maintained face information, determines whether there is a face information of the new registration. In the present embodiment, the biological information acquisition unit 120 determines that the face information of the new registration exists because user D is the new registration user (FIG. 3: S203YES→A2).

Then, the biological information acquisition unit 120 gives notice of the information there exist new registration, against the registration information selecting unit 130. In response to this, the registration information selecting unit 130 inquires whether there is authentication relationship to plurality of target users each other, against the user group information confirmation unit 180. And, the information there exist the authentication relationship is notified to the user group information confirmation unit 180 (FIG. 4: A2→S211).

When the notice of information of the authentication relationship is given, the registration information selecting unit 130 determines whether user group information can be acquired against at least one of the face information among the face information of the target user (FIG. 4: S211YES→S212). In the present embodiment, the user group information of user C can be acquired because user C is an existing registered user. Therefore, registration information selecting unit 130 acquires user group information of user C, and accords the user group information of user D which is a new registration user against user group information of user C, and then authentication succeeds by storing it in the biological information memory unit 140 (FIG. 3: S212YES→S213→A3→S206→END).

For example, the biological information registering unit 150 accords the user group information and stores the face information of user C and user D in the data table 500 shown in FIG. 5. In accordance with exemplary embodiments, an identification number (face information identification number) of the face information and the user group information is associated and stored. At this time, the information such as the name and gender of the user associated with the face information of user D which is a new registration user is stored. If a plural user according to the user group information of the existing registered user (user C) has been already registered, the user D is inserted. Therefore, a plurality of user links to one user group information.

A rule in the case according the user group information can be established. For example, among the users, information of a child and a guardian is stored in advance, if a new registration user is a child, it accords the user group information of the child to the user group information of the guardian. On the other hand, if a new registration user is a guardian, user C may associate with user D regarding the new user group information, by making the user group information newly. At this time, the former user group information may be left and may delete.

On the other hand, as already described, the handling is finished without being accepted when target users do not have authentication relationship (FIG. 4: S211NO→S215→A4→END), there is the authentication relationship, but, when the user group information cannot, be acquired, it becomes the new registration (FIG. 4: S212NO→S214→A3→SS206→END). Furthermore, when all the users who acquired face information are existing registered users, the authentication unit 170 determines whether the user group information of the user accords, and if it accords, the authentication succeeds (FIG. 3: S205YES→S206→END)

(Others Example of Detailed Description of the Preferred Embodiment)

In accordance with exemplary embodiments, the face information was retrieved about all users in the group. On the other hand, it can omit a whole or a part of search handling by displaying the face information of the users having the authentication relationship. For example, the face information of the guardian is retrieved first, and after recognizing the guardian, the face information of the child may be retrieved from the face information of the user having the user group information identical to the guardian. Because the child face has big change tendency, it can be retrieved with more precision by retrieving the face information of the child based on the face information of the guardian with a little tendency of the change The authentication system having above biological information authentication device 100 and authentication device 100 is most suitable for the authentication in the group where the trust relationship between users is required. For example, the authentication system and authentication device can be used in the authentication system in a reliable particular group, or in a service provision site of the membership (e.g., the guardian of a child and the child becomes member).

Industrial Applicability

In the biological information authentication device of this Invention and the biological information authentication system, biological information extracted from a plurality of user is associated to a user group information for showing a trust relationship between said plural users and is memorized. Furthermore, with adjusting the user group information, a biological information registering unit memorizes the each biological information extracted from each user by associating to the biological information memory unit. Therefore, authentication device and authentication system for authenticating only the user where trust relationship is established can be configured because the users where user group matches are accepted by authentication unit among users matching in biological information stored by biological information memory unit, which makes them industrially useful.

What is claimed is:

1. A biological information authentication device installed in a playground equipment facility for authenticating a user of the playground equipment facility by using a biological information extracted from the user comprising:
    a biological information memory unit for storing each biological information extracted from a plurality of users, wherein the biological information extracted from each of said plurality of users is associated with a user group information that shows a trust relationship exists between said plurality of users;
    a user group information confirmation unit for;

a) receiving a determination of whether the trust relationship exists between the plurality of users whose biological information is extracted, and
b) confirming the trust relationship exists between said plurality of users;
a biological information registering unit for adjusting the user group information and the associated biological information extracted from each of said plurality of users stored in the biological information memory unit, when the trust relationship between each of the plurality of users is confirmed by the user group information confirmation unit; and
an authentication unit for concurrently authenticating as a group the plurality of users registered by the biological information registering unit, wherein authenticating is based on the user group information, the associated biological information extracted from each of said plurality of users, and respective face information of each of the plurality of users, wherein the respective face information is all acquired at the same time.

2. The biological information authentication device according to claim 1, further comprising:
a biological information search unit for searching for and retrieving the biological information stored by the information memory unit that matches biological information of a plurality of users targeted for authentication;
wherein the authentication unit concurrently authenticates the plurality of users targeted for authentication, when the biological information retrieved by the biological information search unit matches the biological information of the plurality of users targeted for authentication and user group information of the plurality of users targeted for authentication matches.

3. The biological information authentication device according to claim 1, wherein the user group information confirmation unit includes a unit:
a) for receiving the determination from an administrator and
b) for extracting biological information of the administrator.

4. The biological information authentication device according to claim 1, wherein each of the biological information extracted from each of said plurality of users comprises face information and combinations of one or more of fingerprint information, hand geometry information, retina information, iris information, blood vessel information, voice information, and ear recognition information.

5. The biological information authentication device according to claim 1,
wherein for a particular biological information stored in the biological information memory unit comprising face information, the biological information memory unit stores an associated user name information with said particular biological information, and
wherein the biological information search unit searches the name information associated with the particular biological information, and transmits the face information and the associated name information to a user information acquisition device for outputting sound corresponding to the name information and displaying the face information.

6. The biological information authentication device according to claim 1, wherein the biological information memory unit stores the respective biological information extracted from each said user in as manner so to distinguish said user as either a main user or an auxiliary user, and
wherein the user group information confirmation unit receives the determination on whether the trust relationship exists between the plurality of users, wherein the plurality of users comprises at least one main user and at least one auxiliary user.

7. A biological information authentication system for authenticating a user by using a biological information extracted from the user comprising:
a server connectable via a network to a plurality of biological information authentication devices set forth in claim 1;
each biological information authentication device for transmitting a biological information stored by its respective biological information memory unit to the server;
the server transmits each received biological information to the respective biological information memory units provided in the plurality of biological information authentication devices.

8. The biological information authentication device according to claim 1, wherein the plurality of users authenticated as a group includes a user of playground equipment in the playground equipment facility and a payor of fees for use of the playground equipment.

* * * * *